(12) United States Patent
Hashimoto

(10) Patent No.: US 6,395,076 B1
(45) Date of Patent: May 28, 2002

(54) NON-CALCINED LEAD OF A COLORED PENCIL

(75) Inventor: Yuka Hashimoto, Osaka (JP)

(73) Assignee: Sakura Color Products Corporation, Osaka-fu (JP)

( * ) Notice: Subject to any disclaimer, the term of this patent is extended or adjusted under 35 U.S.C. 154(b) by 0 days.

(21) Appl. No.: 09/463,468

(22) PCT Filed: May 25, 1999

(86) PCT No.: PCT/JP99/02754

§ 371 (c)(1),
(2), (4) Date: Jan. 25, 2000

(87) PCT Pub. No.: WO99/61537

PCT Pub. Date: Dec. 2, 1999

(30) Foreign Application Priority Data

| May 27, 1998 | (JP) | 10-164248 |
| May 27, 1998 | (JP) | 10-164249 |
| Jun. 19, 1998 | (JP) | 10-189819 |
| Sep. 2, 1998 | (JP) | 10-247937 |
| May 20, 1999 | (JP) | 10-139492 |

(51) Int. Cl.$^7$ ............................................. C09D 13/00
(52) U.S. Cl. ................... 106/31.11; 106/31.12
(58) Field of Search ........................... 106/31.11, 31.12

(56) References Cited

U.S. PATENT DOCUMENTS

| 2,280,988 A | * | 4/1942 | Weiser | 106/31.12 |
| 2,338,176 A | * | 1/1944 | Goepfert | 106/31.12 |
| 3,360,489 A | * | 12/1967 | Grossman et al. | 106/31.12 |
| 3,821,157 A | * | 6/1974 | Muller et al. | 106/31.11 |
| 4,668,572 A | * | 5/1987 | Iizuka et al. | 106/31.11 |
| 5,318,622 A | * | 6/1994 | Kitazawa et al. | 106/31.12 |
| 5,346,540 A | * | 9/1994 | Sclennert | 106/31.11 |
| 5,407,472 A | * | 4/1995 | Yamamoto | 106/31.12 |
| 5,595,700 A | * | 1/1997 | Kitazawa | 106/31.12 |
| 5,716,434 A | * | 2/1998 | Koyama | 106/31.11 |
| 6,056,810 A | * | 5/2000 | Lugert | 106/31.11 |

FOREIGN PATENT DOCUMENTS

| JP | 49-039124 | 10/1974 |
| JP | 53-077720 | 7/1978 |
| JP | 56-12-275 | 10/1981 |
| JP | 62-001769 | 1/1987 |
| JP | 62-027480 | 2/1987 |
| JP | 62-027481 | 2/1987 |
| JP | 62-177081 | 8/1987 |
| JP | 02-255778 | 10/1990 |
| JP | 03-000784 | 1/1991 |
| JP | 03-106976 | 5/1991 |
| JP | 03-153778 | 7/1991 |
| JP | 04-033970 | 2/1992 |
| JP | 05-039449 | 2/1993 |
| JP | 05-271605 | 10/1993 |
| JP | 07-316483 | 12/1995 |
| JP | 08-283647 | 10/1996 |
| JP | 09-143418 | 6/1997 |

OTHER PUBLICATIONS

Abstract of JP 53077720 A, Jul. 10, 1978, Derwent.*
International Search Report for PCT/JP99/02754 dated Aug. 2, 1999.

* cited by examiner

*Primary Examiner*—C. Melissa Koslow
*Assistant Examiner*—Veronica F. Faison
(74) *Attorney, Agent, or Firm*—Merchant & Gould P.C.

(57) ABSTRACT

A non-calcined lead of a colored pencil obtainable by following process:

a binder or its solution are added to a mixture comprising a colorant, a body filler, and a solvent as required, and the resultant mixed compound is kneaded, after that, the said solvent is removed, and the resultant mixture is mixed together with O/W emulsion comprising an oily substance being a liquid at ordinary temperature, one or more surfactant(s) having a H.L.B value of not less than 7 nor more than 18 and water, the mixed ingredients are formed, and the water contained in the said O/W emulsion and the said solvent if any remains is removed. A synthetic mica is contained as a lubricant, and the said body filler is at least one compound selected from the group consisting of wollastonite, attapulgite, haloysite kaolin and sepiolite.

22 Claims, No Drawings

NON-CALCINED LEAD OF A COLORED PENCIL

FIELD OF THE INVENTION

The present invention relates to a non-calcined lead of a colored pencil.

BACKGROUND OF THE ART

Conventionally, a non-calcined lead of a colored pencil is made by kneading raw ingredients such as a binder, a colorant, a body filler, a lubricant and a solvent, and forming the kneaded composition by extrusion. And as required, the mentioned solvent is removed by way of drying. Further, the conventional non-calcined lead of a colored pencil contains a wax, fats and oils, specifically a solid wax, fats and oils to obtain a coloring power.

Different from a calcined (baked) colored pencil lead having a skeleton of clay or a skeleton of carbon of carbide, a non-calcined lead of a colored pencil can contain wider variety of a colorant, and exhibits better writing characteristic because a binder is not treated by high temperature.

As a binder, an organic polymer is used. More concretely, various water-soluble binders such as sodium carboxymethylcellulose, polyvinyl alcohol and methylcellulose are used.

As a lubricant, various materials are used generally. Particularly, a boron nitride is used widely because it is similar in its crystallographic structure to graphite and has an excellent lubricity. Moreover, it is white and does not affect on color or tone of a colored pencil lead.

However with these conventional non-calcined leads of a colored pencil containing a solid wax, fats and oils, its writing portion cannot be erased with a rubber eraser because the wax, fats and oils contained herein is solid. On the other hand, in case of a non-calcined lead of a colored pencil prepared with wax, fats and oils that is liquid at room temperature together with a colorant, a body filler and a water-soluble resin, its forming is difficult and its strength and coloring power lowers. To overcome these problems, a non-calcined lead of a colored pencil may be prepared with oil immersion of the formed lead at room temperature. So that the non-calcined lead obtains erasability with a rubber eraser and coloring power owing to immersed wax, fats and oils while maintaining the forming performance and strength owing to a core of lead composition without wax, fats and oils. However, to prepare this oil-immersed colored pencil lead, the oil immersion process is necessary after the raw ingredients without wax, fats and oils are kneaded, formed and dried. This oil immersion process requires heating or drawing the vacuum in order to immerse oils into a lead. Further, after the oil immersion, the oil on the surface of a lead should be removed with a treatment under centrifugation, washing with solvent, wiping out, heating and so on. Accordingly, the processes is quite complicated and the production cost will be expensive.

Even though the conventional non-calcined lead of a colored pencil without any erasability with a rubber eraser, when it contains an organic polymer as a binder and further contains wax, fats and oils, it is still inferior to a calcined lead containing clay or carbide in mechanical strength such as flexural strength and point strength.

Waxes, oils and fats, regardless of being solid, semisolid, or liquid, have disadvantages of lowering not only mechanical strength but also the forming performance of a lead. Particularly, oily substance such as wax, fats and oils that is liquid at room temperature has a strong tendency to deteriorate mechanical strength and forming performance of lead. On the other hand, with solid wax, fats and oils, it is difficult to make a non-calcined lead of a colored pencil that can be erased by an eraser.

Regardless of having an erasability with a rubber eraser or not, a non-calcined lead of a colored pencil containing a conventional water-soluble binder has disadvantages in that its writing characteristic and coloring power deteriorate at high humidity and further its wood shaft breaks because the volume of a lead swells.

Regardless of having an erasability with a rubber eraser or not, a non-calcined lead of a colored pencil containing a boron nitride has disadvantages in that mechanical strength is not enough and the lead breaks often when being applied for writing or with a shock of dropping. And a boron nitride is quite expensive and its cost performance is not enough for preparing a colored pencil, which should be provided with low price. A development of a substitute to a boron nitride has been demanded among the skilled person in the art.

It is therefore an object of the present invention to provide a non-calcined lead of a colored pencil with an excellent erasability with a rubber eraser while maintaining a coloring power, mechanical strength and forming performance, which can be made by easy process without the above-mentioned oil immersion process.

It is another object of the invention to provide a non-calcined lead of a colored pencil with improved mechanical strength compared to the conventional non-calcined lead of a colored pencil even though containing an organic polymer as a binder and in case, further including fats and oils, and wax.

It is a further object of the present invention to provide a non-calcined lead of a colored pencil with improved mechanical strength, forming performance and improved coloring power though containing oily substance that is liquid at a room temperature.

It is another object of the present invention to provide a non-calcined lead of a colored pencil that does not swell nor deteriorate the writing characteristic and coloring power even at high humidity.

It is a further object of the present invention to provide a non-calcined lead of a colored pencil having better mechanical strength and difficult to break, and having better writing characteristic, coloring power and cost performance, compared to a lead containing a boron nitride as a lubricant.

DISCLOSURE OF THE INVENTION

As a result of an intensive study, the present inventor found that a non-calcined lead of colored pencils comprising a binder, a colorant, a body filler, an oily substance being a liquid at room temperature and one or more surfactant(s) having a H.L.B value of not less than 7 nor more than 18, can be made with an easy process and exhibits excellent erasability with a rubber eraser while maintaining a coloring power, mechanical strength and forming performance. The present invention is a non-calcined lead of a colored pencil comprising a binder, a colorant, a body filler, an oily substance being liquid at room temperature and one or more surfactants having a H.L.B. value of not less than 7 nor more than 18.

Specifically, a non-calcined lead of a colored pencil made with a following process exhibits an excellent erasability with a rubber eraser when applied to writing:

A binder or its solution is introduced into a mixture comprising a colorant, a body filler, and a solvent as required and kneaded. Then the mentioned solvent is removed. An O/W emulsion comprising an oily substance that is liquid at room temperature, one or more surfactants having a H.L.B. value of within the range between 7 and 18 and water is introduced into the resultant mixture and mixed together. After the mixed raw ingredients is formed, the water contained in the above-mentioned O/W emulsion and the mentioned solvent are removed, if any remains, to obtain a non-calcined lead of a colored pencil. In addition, the mentioned O/W emulsion preferably contains a water-soluble resin (a water-soluble binder) for stabilizing the emulsion.

The present inventor found also that with a non-calcined lead of a colored pencil comprising a colorant, a body filler, a binder, an oily substance such as a wax, fats and oils and one or more surfactant(s) having a H.L.B. value of not less than 1 less than 9 and a surfactant(s) having a H.L.B. value of not less than 9 nor more than 20, its coloring power, mechanical strength and forming performance are improved.

As a result of an intensive study, the present inventor found that when wollastonite, attapulgite, halloysite kaolin, sepiolite are used as a body filler, mechanical strength of a non-calcined lead of a colored pencil can be improved even though an organic polymer as a binder is contained or further, a wax, fats and oils is contained.

The present invention is a non-calcined lead of a colored pencil comprising a binder, a colorant and a body filler as raw ingredients, fats and oils, wax and a lubricant is added as required, wherein the above-mentioned body filler is wollastonite.

The present invention is a non-calcined lead of a colored pencil comprising a binder, a colorant and a body filler as raw ingredients, and fats and oils, wax and a lubricant is added as required, wherein the above-mentioned body filler is attapulgite.

The present invention is a non-calcined lead of a colored pencil comprising a binder, a colorant and a body filler as raw ingredients, and fats and oils, wax and a lubricant is added as required, wherein the above-mentioned body filler is halloysite kaolin.

The present invention is a non-calcined lead of a colored pencil comprising a binder, a colorant and a body filler as raw ingredients, and fats and oils, wax and a lubricant is added as required, wherein the above-mentioned body filler is sepiolite.

The present invention is a non-calcined lead of a colored pencil comprising a binder, a colorant and a body filler as raw ingredients, and fats and oils, wax and a lubricant is added as required, wherein the above-mentioned body filler is at least two compounds selected from the group consisting of wollastonite, attapulgite, halloysite kaolin and sepiolite.

Further, the present inventor developed a non-calcined lead of a colored pencil comprising a binder, a colorant, a body filler and a lubricant as raw ingredients, and fats and oils and/or wax is added as required, wherein the above-mentioned lubricant is synthetic mica.

Moreover, the present inventor found that a non-calcined lead containing a carboxymethylcellulose acid (hereinafter shortened as CMC acid) as a binder, deterioration of writing characteristic and coloring power can be restrained and the swelling of a lead can be prevented even at high humidity.

The present invention is a non-calcined lead of a colored pencil comprising a binder, a colorant, a body filler and a lubricant as raw ingredients, and further including fats and oils and/or a wax as required, wherein the above-mentioned binder is carboxymethylcellulose acid.

THE PREFERRED EMBODIMENT TO CARRY OUT THE INVENTION (Surfactant(s) having a H.L.B. value of not less than 7 nor more than 18)

In the present invention, the surfactant added together with an oily substance that is liquid at room temperature is not specifically limited as long as it is one or more surfactant (s) having H.L.B. value of not less than 7 nor more than 18. "One or more surfactant(s) having a H.L.B. value of not less than 7 nor more than 18" include also a mixture of more than two surfactants that resultant a H.L.B. value is not less than 7 nor more than 18 besides each of those surfactants individually having a H.L.B. value of not less than 7 nor more than 18. When a surfactant has H.L.B. value of less than 7, its emulsification is W/O type. On the other hand, the surfactant has H.L.B. value within the range between not less than 7 nor more than 18 and it is preferable for composing an O/W emulsion with the oily substance that is liquid at room temperature.

Examples of a surfactant having a H.L.B. value within the range between not less than 7 nor more than 18 include;

Sorbitan monolaurate(H.L.B. value: 8.6),

Polyoxyethylene lauryl ether (Number of additional moles of ethylene oxide chain: n=4 mol, H.L.B. value: 9.5), Polyoxyethylene sorbitan monostearate (Number of additional moles of ethylene oxide chain: n=4 mol, H.L.B. value: 9.6), Polyoxyethylene sorbitan monooleate (Number of additional moles of ethylene oxide chain: n=5 mol, H.L.B. value: 10.0), Decaglyceryl diisostearate (H.L.B. value: 10.0), Polyoxyethylene sorbitan tristearate (Number of additional moles of ethylene oxide chain: n=4 mol, H.L.B. value: 10.5), Polyoxyethylene sorbitan trioleate (Number of additional moles of ethylene oxide chain: n=4 mol, H.L.B. value: 11.0), Polyoxyethylene glycol 400 ester monooleate (H.L.B. value: 11.4)

Polyoxyethylene glycol 400 ester monostearate (H.L.B. value: 11.6)

Decaglyceryl monooleate (H.L.B. value: 12.0),

Polyoxyethylene nonylphenol (Number of additional moles of ethylene oxide chain: n=9 mol, H.L.B. value: 13.0), Polyethylene glycol 400 monolauric esther (H.L.B. value: 13.1), Polyoxyethylene sorbitan monolaurate (Number of additional moles of ethylene oxide chain: n=4 mol, H.L.B. value: 13.3), Polyoxyethylene sorbitan monostearate (Number of additional moles of ethylene oxide chain: n=20 mol, H.L.B. value: 14.9), Polyoxyethylene sorbitan monooleate (Number of additional moles of ethylene oxide chain: n=20 mol, H.L.B. value: 15.0), Polyoxyethylene stearyl ether (Number of additional moles of ethylene oxide chain: n=20 mol, H.L.B. value: 15.3), Polyoxyethylene oleyl ether (Number of additional moles of ethylene oxide chain: n=20 mol, H.L.B. value: 15.4), Monopalmitic acid polyoxyethylene sorbitan (Number of additional moles of ethylene oxide chain: n=20 mol, H.L.B. value: 15.6), Polyoxyethylene cetyl ether (Number of additional moles of ethylene oxide chain: n=20 mol, H.L.B. value: 15.7), Polyoxyethylene stearic acid ester (Number of additional moles of ethylene oxide chain: n=30 mol, H.L.B. value: 16.0), Polyoxyethylene (Number of additional moles of ethylene oxide chain: n=20 mol), Polyoxypropylene (Number of additional moles of propylene oxide chain: n=8 mol), Cetyl ether (H.L.B. value: 16.9), Polyoxyethylene stearic acid ester (Number of additional moles of ethylene oxide chain: n=40 mol, H.L.B. value: 16.9).

Specifically, decaglyceryl monooleate, decaglyceryl diisostearate, polyoxyethylene sorbitan monoolerate (Number of additional moles of ethylene oxide chain: n=20 mol), polyoxyethylene (Number of additional moles of ethylene oxide chain: n=20 mol), polyoxypropylene (Number of additional moles of propylene oxide chain: n=8 mol), cetylether are preferable.

Further, the combination of more than two surfactants can be used as a surfactant having a H.L.B. value of not less than 7 nor more than 18. In this case, the following surfactants is applicable besides the above-mentioned surfactants:

Sorbitan trioleate (H.L.B. value: 1.8),
Sorbitan tristearate (H.L.B. value: 2.1),
Propylene glycol monostearate (H.L.B. value: 3.4),
Sorbitan sesquioleate (H.L.B. value: 3.7),
Non self-emulsifiable glycerol monostearate (H.L.B. value: 3.8),
Sorbitan monooleate (H.L.B. value: 4.3),
Propylene glycol monolaurate (H.L.B. value: 4.5),
Dietyleneglycol monostearate (H.L.B. value: 4.7),
Sorbitan monostearate (H.L.B. value: 4.7),
Self-emulsifiable glycerol monostearate (H.L.B. value: 5.5),
Diethyleneglycol monolaurate (H.L.B. value: 6.1),
Sorbitan monopalmitiate (H.L.B. value: 6.7),
Glyceryl monooleate (H.L.B. value: 2.5) and the like.

Among them, the sorbitan sesquioleate and glyceryl monooleate are preferable.

The content of the surfactant having a H.L.B. value of not less than 7 nor more than 18 should be more than 1% by weight relative to the total amount of the raw ingredients composition (solid content). When the content of the surfactant is less than 1% by weight, the coloring power, mechanical strength and forming performance for the extrusion forming deteriorate.

And the content of the surfactant having a H.L.B. value of not less than 7 nor more than 18 should be less than 10% by weight relative to the total amount of the raw ingredients composition (solid content). When the content of the surfactant is greater than 10% by weight relative to the total amount of the raw ingredients composition (solid content), the writing characteristic deteriorates.

(Oily substance)

Examples of fats and oils, and a wax (hereinafter may be called "oily substance") to be used include a liquid paraffin, silicone oil, α-olefin oligomer, a paraffin wax, a microcrystalline wax, a ketone wax, vaseline, a beeswax, hardened beef tallow, a Japan wax, a carnauba wax, stearic acid and the like. Fats and oils and a wax can be used either alone or as a mixture regardless of being natural or synthetic. The most preferable examples of fats and oils and a wax include a liquid paraffin, silicone oil and vaseline.

The oily substance may be added as required depending on the other ingredients. The oily substance can be impregnated into a formed lead or used as an emulsion containing the above-mentioned surfactant.

The oily substance such as fats and oils, a wax is added for giving the coloring power and their content is preferably 3% to 10% by weight relative to the total amount of the raw ingredient composition (solid content). When the content is less than 3% by weight, the writing characteristic and the coloring power deteriorate. On the other hand, when the content exceeds 10% by weight, the forming performance to be lead shape deteriorates and the mechanical strength lowers.

In case the erasability with a rubber eraser is required with a non-calcined lead of a colored pencil, the above-mentioned oily substance that is liquid at room temperature is preferable to be used. However, if the erasability with a rubber eraser is not particularly needed, the various oily substance such as fats and oils and a wax are applicable regardless of being liquid, semisolid or solid.

A non-calcined lead of a colored pencil with erasability with the rubber eraser can be prepared with the following mentioned process:

A binder or its solution is introduced into a mixture comprising a colorant, a body filler and a solvent as required and kneaded. Then the mentioned solvent is removed from the resultant mixture. The OW emulsion comprising an oily substance that is liquid at room temperature, one or more surfactants having H.L.B. value of not less than 7 nor more than 18 and water is introduced herein and mixed together. After the mixed raw ingredient composition is formed, the water contained in the above-mentioned O/W emulsion and the mentioned solvent, if any remains, are removed to obtain a non-calcined lead of a colored pencil. The non-calcined lead prepared by the above-mentioned process would particularly have an excellent erasability with a rubber eraser.

The present inventor inspected the cause of this excellent erasability with a rubber eraser of the above-mentioned non-calcined lead of a colored pencil. With introducing a binder or its solution into a mixture comprising a colorant, a body filler and as required, a solvent such as water, the colorant and the body filler are dispersed in the solution containing the binder. When the mixture is kneaded and the mentioned solvent such as water is removed, fine particles of the mentioned colorant and body filler with its surface covered by the binder are obtained. Then the O/W emulsion comprising an oily substance that is liquid at room temperature, one or more surfactants having H.L.B. value of the range between not less than 7 nor more than 18 and water is added to this mixture, and the mixture is kneaded and formed. The water contained in the O/W emulsion and the solvent, if any remains, is removed by way of drying and the like. With these process, an aggregate is made by the oily substance fasten to the fine particles of the colorant and the body filler through the binder under the influence of one or more surfactants having H.L.B. value of the range of between not less than 7 nor more than 18. This aggregate would be a main body of the non-calcined lead of a colored pencil and that would be the reason for that the present non-calcined lead of a colored pencil has an excellent erasability with a rubber eraser.

The present invention is a non-calcined lead of a colored pencil comprising the binder, the mentioned colorant, the mentioned body filler, the oily substance that is liquid at room temperature and one or more surfactant(s) having H.L.B. value of not less than 7 nor more than 18, and therefore, the oily substance that is liquid at room temperature can exist without weaken the binding power of the binder and thus a formed lead with mechanical power can be obtained. Further, because the particles of the mentioned colorant and body filler are covered with the binder, the writing portion formed by the present non-calcined lead of a colored pencil comprises the aggregation of the colorant particles and body filler particles covered with the binder wherein the oily substance that is liquid at room temperature is contained. That is, the written portion is not covered with the oily substance as such a wax, fats and oils. Therefore, it exhibits particularly excellent erasability with a rubber eraser.

From the reasons mentioned above, the oily substance that is liquid at room temperature is preferable to be used for a non-calcined lead of a colored pencil that requires an erasability with a rubber eraser. The oily substance that is liquid at room temperature can exist without weaken the binding power of the binder under the influence of one or more surfactants having H.L.B. value of not less than 7 nor more than 18. Then, the writing portion on the paper comprises the aggregation of particles of the colorant and the body filler covered with the binder wherein the oily substance that is liquid at room temperature is contained and the surface of the writing potion is not covered with the oily substance such as a wax, fats and oils.

Examples of the oily substance that is liquid at room temperature include a liquid paraffin, silicone oil, α-olefin oligomer, whale oil, liquid lanolin, castor oil, olive oil, epoxy soyabean oil, squalene and the like. The oily substance can be used either alone or as a mixture regardless of being natural or synthetic.

The oily substance that is liquid at room temperature is introduced for giving a coloring power and a color developing property at room temperature together with the erasability with a rubber eraser. Its content is preferably 3% by weight to 20% by weight relative to the total amount of the raw ingredient compositions (solid content). When the content is less than 3% by weight, the writing characteristic and the coloring power deteriorate. On the other hand, if the content exceeds 20% by weight, the forming performance lowers and the mechanical power is not sufficient.

(Surfactants with a low H.L.B value and a high H.L.B value)

In the present invention, a non-calcined lead of a colored pencil containing two specific surfactants having a low H.L.B. value and a high H.L.B. value respectively exhibits an improved forming performance with an extrusion molding machine, improved mechanical strength and coloring power though the oily substance that is liquid at room temperature such as a wax, fats and oils, particularly a liquid paraffin is contained, regardless of having the erasability with a rubber eraser or not.

Two specific surfactants having a low H.L.B. value and a high H.L.B. value respectively means a surfactants having a H.L.B. value of not less than 1 less than 9 and a surfactants having a H.L.B. value of not less than 9 nor more than 20, and preferably, sorbitan fatty acid ester having a H.L.B. value of not less than 1 less than 9 and polyoxyethylene sorbitan fatty acid ester having a H.L.B. value of not less than 9 nor more than 20.

The reason why such a type of non-calcined lead of a colored pencil exhibits the improved mechanical strength, forming performance and coloring power is not clear yet. However, a surfactants having a H.L.B. value of not less than 1 less than 9 and a surfactants having a H.L.B. value of not less than 9 nor more than 20, especially, with using both the sorbitan fatty acid ester having H.L.B. value of not less than 1 less than 9 and the polyoxyethylene sorbitan fatty acid ester having H.L.B. value of not less than 9 nor more than 20, the wax, fats and oils seems to stop hindering the biding power of the binder contained in raw ingredients and at the same time, the wetting of the surface of the pigment increases.

Examples of surfactants having H.L.B. value of not less than 1 less than 9 include:
  Sorbitan trioleate (H.L.B. value: 1.8)
  Sorbitan tristearate (H.L.B. value: 2.1)
  Propyleneglycol monostearate (H.L.B. value: 3.4)
  Sorbitan sesquioleate (H.L.B. value: 3.7)
  Non self-emulsifiable glycerol monostearate (H.L.B. value: 3.8)
  Sorbitan monooleate (H.L.B. value: 4.3)
  Propyleneglycol monolaurate (H.L.B. value: 4.5)
  Diethyleneglycol monostearate (H.L.B. value: 4.7)
  Sorbitan monostearate (H.L.B. value: 4.7)
  Self-emulsifiable glycerol monostearate (H.L.B. value: 5.5)
  Diethyleneglycol monolaurate (H.L.B. value: 6.1)
  Sorbitan monopalmitate (H.L.B. value: 6.7)
  Sorbitan monolaurate (H.L.B. value: 8.6).

Specifically,
  Sorbitan trioleate (H.L.B. value: 1.8),
  Sorbitan tristearate (H.L.B. value: 2.1),
  Sorbitan sesquioleate (H.L.B. value: 3.7),
  Sorbitan monooleate (H.L.B. value: 4.3),
  Sorbitan monostearate (H.L.B. value: 4.7),
  Sorbitan monopalmitate (H.L.B. value: 6.7),
  Sorbitan monolaurate (H.L.B. value: 8.6) are preferable to be used.

The most preferable is the Sorbitan sesquioleate (H.L.B. value: 3.7).

Examples of surfactants having H.L.B. value of not less than 9 nor more than 20 include:
  Polyoxyethylene laurylether (Number of additional moles of ethylene oxide chain: n=4 mol, H.L.B. value: 9.5)
  Monostearate acid polyoxyethylene sorbitan (Number of additional moles of ethylene oxide chain: n=4 mol, H.L.B. value: 9.6)
  Polyoxyethylene sorbitan monooleate (Number of additional moles of ethylene oxide chain: n=5 mol, H.L.B. value: 10.0)
  Polyoxyethylene sorbitan tristearate (Number of additional moles of ethylene oxide chain: n=4 mol, H.L.B. value: 10.5)
  Polyoxyethylene sorbitan trioleate (Number of additional moles of ethylene oxide chain: n=4 mol, H.L.B. value: 11.0)
  Polyoxyethylene glycol 400 monooleate (H.L.B. value: 11.4)
  Polyoxyethylene glycol 400 monostearate (H.L.B. value: 11.6)
  Polyoxyethylene nonylphenyl (Number of additional moles of ethylene oxide chain: n=9 mol, H.L.B. value: 13.0)
  Polyoxyethylene glycol 400 monolaurate (H.L.B. value: 13.1)
  Polyoxyethylene sorbitan Monolaurate (Number of additional moles of ethylene oxide chain: n=4 mol, H.L.B. value: 13.3)
  Polyoxyethylene sorbitan Monostearate (Number of additional moles of ethylene oxide chain: n=20 mol, H.L.B. value: 14.9)

Polyoxyethylene sorbitan monooleate (Number of additional moles of ethylene oxide chain: n=20 mol, H.L.B. value: 15.0)

Polyoxyethylene stearyl ether (Number of additional moles of ethylene oxide chain: n=20 mol, H.L.B. value: 15.3)

Polyoxyethylene oleyl ether (Number of additional moles of ethylene oxide chain: n=20 mol, H.L.B. value: 15.4)

Polyoxyethylene sorbitan monopalmitate (Number of additional moles of ethylene oxide chain: n=20 mol, H.L.B. value: 15.6)

Polyoxyethylene cetyl ether (Number of additional moles of ethylene oxide chain: n=20 mol, H.L.B. value: 15.7)

Polyoxyethylene stearate (Number of additional moles of ethylene oxide chain: n=30 mol, H.L.B. value: 16.0)

Polyoxyethylene stearate (Number of additional moles of ethylene oxide chain: n=40 mol, H.L.B. value: 16.9)

Polyoxyethylene stearate (Number of additional moles of ethylene oxide chain: n=100 mol, H.L.B. value: 18.8).

Among them,

Polyoxyethylene sorbitan monostearate (Number of additional moles of ethylene oxide chain: n=4 mol, H.L.B. value: 9.6)

Polyoxyethylene sorbitan monooleate (Number of additional moles of ethylene oxide chain: n=5 mol, H.L.B. value: 10.0)

Polyoxyethylene sorbitan tristearate (Number of additional moles of ethylene oxide chain: n=4 mol, H.L.B. value: 10.5)

Polyoxyethylene sorbitan trioleate (Number of additional moles of ethylene oxide chain: n=4 mol, H.L.B. value: 11.0)

Polyoxyethylene sorbitan monolaurate (Number of additional moles of ethylene oxide chain: n=4 mol, H.L.B. value: 13.3)

Polyoxyethylene sorbitan monostearate (Number of additional moles of ethylene oxide chain: n=20 mol, H.L.B. value: 14.9)

Polyoxyethylene sorbitan monooleate (Number of additional moles of ethylene oxide chain: n=20 mol, H.L.B. value: 15.0)

Polyoxyethylene sorbitan monopalmitate (Number of additional moles of ethylene oxide chain: n=20 mol, H.L.B. value: 15.6) are preferable to be used.

Specifically, polyoxyethylene sorbitan monooleate (Number of additional moles of ethylene oxide chain: n=20 mol, H.L.B. value: 15.0) is the most preferable to be used.

From the above, the most preferable combination for the present invention is that of sorbitan sesquioleate (H.L.B. value: 3.7) and polyoxyethylene sorbitan monooleate (Number of additional moles of ethylene oxide chain: n=20 mol, H.L.B. value: 15.0).

The preferable proportion for compounding of this combination is 0.65 to 0.7:0.35 to 0.3 (sorbitan sesquioleate polyoxyethylene sorbitan monooleate) and more preferably, 0.67:0.33, that is, almost 2:1.

When the proportion of the sorbitan sesquioleate is less than 0.65, that is, when the proportion of the polyoxyethylene sorbitan monooleate exceeds 0.35, the mechanical strength and the forming performance are not improved enough though the coloring power is improved. When the proportion of sorbitan sesquioleate exceeds 0.7, that is, when that of the polyoxyethylene sorbitan monooleate is less than 0.3, the mechanical strength and the forming performance are not improved enough though the coloring power is improved. It is because the resultant H.L.B. value of the mixture of the mentioned two surfactants is not proper while the wetting of the surface of the pigment is improved with these surfactants.

The content of combination of the sorbitan fatty acid ester having H.L.B. value of not less than 1 less than 9 and the polyoxyethylene sorbitan fatty acid ester having H.L.B. value of not less than 9 nor more than 20 is preferably more than 1 % by weight. Specifically, the content of the combination of the sorbitan sesquioleate and the polyoxyethylene sorbitan monooleate (Number of additional moles of ethylene oxide chain: n=20 mol) are preferably more than 1% by weight. If the content of the two is less than 1% by weight, the coloring power and the mechanical strength and the forming performance with the extrusion former deteriorate.

On the other hand, when the content of the combination of the sorbitan fatty acid ester having H.L.B. value of not less than 1 less than 9 and the polyoxyethylene sorbitan monooleate having H.L.B. value of not less than 9 nor more than 20 is more than 10% by weight, the writing characteristic deteriorates.

(a body filler)

Applicable as a body filler is known body filler, for example, talc, magnesium carbonate, calcium carbonate, silica, aluminasilicate, kaolin, bentonite and the like. These body fillers can be used either alone or as a mixture. The talc is the most preferable body filler to be used in the present invention.

Further, when at least one body filler selected from the group consisting of wollastonite, attapulgite, halloysite kaolin and sepiolite, is used, the mechanical strength of the present non-calcined lead of a colored pencil can be improved. Accordingly, the most preferable body filler in the present invention includes wollastonite, attapulgite, halloysite kaolin and sepiolite.

The wollastonite used in the present invention is fibrous or massive white mineral that is represented as $CaSiO_3$ or $CaO.SiO_2$ and called also calcium silicate or skarn mineral. Wollastonite is classified into a low temperature calcium silicate and a high temperature calcium silicate. The both are applicable in the present invention. Both natural and synthetic wollastonite can be used without any problem and their grade is neither limited. The preferable wollastonite to be used in the present invention include the one produced by WOLKEM PRIVATE LIMITED under the trade name of "HYCON A-60".

The attapulgite used in the present invention is a colloidal inorganic mineral having a thin wood-chip like shape and called "hydrous magnesium aluminum silicate" in the chemical field. Its composition is shown as $3MgO.1.5Al_2O_3.8SiO_2.9H_2O$ and it is a member of a family of an inorganic mineral with very fine particles that is known as acid clay. The grade of attapulgite is not specifically limited and attapulgite of any grade is used preferably. Its hegman grind value indicating the degree of dispersion is neither limited. The examples of attapulgite to be used preferably in the present invention include trade name "ATTAGEL 40" and "ATTAGEL 50", available from ENGELHARD CORPORATION.

The halloysite kaolin used in the present invention is also called "whiteclay". It is different from the generally called kaolinite clay mineral such as kaolinite, dickite, nacrite or halloysite. The halloysite kaolin used in the present invention has more plasticity and dry strength compared to the mentioned kaolins and has a tubular crystallographic structure. The halloysite kaolin is clearly distinguished from the other general kaolins having a hexagonal plate like crystallographic structure because its crystallographic structure is tubular. Halloysite kaolin is generally classified into a primary kaolin and a secondary kaolin. Both are applicable in the present invention. Its grade is not limited and any grade can be used preferably. The example of Halloysite kaolin to be used preferably in the present invention includes trade name "NIADO 400" available from Tsuchiya Kaolin Ind., Ltd.

The sepiolite to be used in the present invention is a hydrous magnesium silicate that is fibrous and porous. Its grade is not limited and any grade is applicable to be used in the present invention. The particularly preferable example includes trade name "SEPIOLITE S" available from NIPPON TALC CO.,LTD.

The content of the body filler is 60% by weight to 80% by weight and preferably, 65% by weight to75% by weight relative to the total amount of the raw ingredient composition (solid content). When the content of the body filler is more than 80% by weight relative to the total amount of the raw ingredient composition, the forming performance to be lead shape deteriorates. When the content is less than 60% by weight, the writing characteristic deteriorates.

At least one body filler selected from the group consisting of wollastonite, attapulgite, halloysite kaolin and sepiolite is preferably contained in the proportion of 1% by weight to 20% by weight relative to the total amount of the raw ingredient composition (solid content). When the content of the mentioned body filler is less than 1% by weight relative to the total amount of the raw ingredient composition (solid content), the mechanical strength is not sufficient. On the other hand, when the content exceeds 20% by weight, the writing characteristic deteriorates. The most preferable content of the above-mentioned body filler is 5% by weight to 10% by weight relative to the total amount of the raw ingredient composition (solid content).

It is preferable to use at least one body filler selected from wollastonite, attapulgite, halloysite kaolin and sepiolite together with other known body filler. Examples of these known body fillers include talc, magnesium carbonate, calcium carbonate, silica, aluminosilicate, kaolin and bentonite. These body fillers can be used either alone or as a mixture.

The total amount of the body filler combining at least one body filler selected from wollastonite, attapulgite, halloysite kaolin and sepiolite together with the other known body filler is preferably, 60% by weight to 80% by weight relative to the total amount of the raw ingredient composition (solid content). The most preferable content is 65% by weight to 75% by weight.

The reason why the non-calcined lead of a colored pencil containing at least one body filler selected from wollastonite, attapulgite, halloysite kaolin and sepiolite improves a mechanical strength is not clear yet. However each compound of wollastonite, attapulgite, halloysite kaolin and sepiolite is granular and fibrous respectively and then, it is suggested that these compound is oriented to the same direction when they are extruded together with the other ingredients to be formed as a lead. This would be the cause of the improvement of the mechanical strength.

(Binder)

Examples of the binder to be used in the present invention include sodium carboxymethylcellulose (sodium CMC), ammonium carboxymethylcellulose (ammonium CMC), carboxymethylcellulose acid (CMC acid), methylcellulose, nitrocellulose, polyvinyl alcohol, gum arabic, methylhydroxyethylcellulose. The other known water-soluble and water-insoluble polymer compound can be used also regardless of being natural or synthetic. Particularly, sodium carboxymethylcellulose (sodium CMC) and methylhydroxyethylcellulose are preferable to be used. These can be used either alone or as a mixture.

Example of ammonium CMC preferably to be used includes the trade name "DN-100L" available from Daicel Chemical Industries, LTD. The ammonium CMC can be used either alone or together with the other binders. As such other binders, known binders conventionally used for a non-calcined lead of a colored pencil are applicable and those with certain strength and stiffness are more preferable.

The content of the binder is 3% by weight to 15% by weight and preferably, 4% by weight to 6% by weight relative to the total amount of the raw ingredient composition (solid content). When the content of the binder is more than 15% by weight, the writing characteristic deteriorates. When the content is less than 3% by weight, the mechanical strength and the forming-performance to a shape of a lead lower. The most preferable range of the content is from 5% by weight to 10% by weight. In case of the following non-calcined lead of the colored pencil containing CMC acid, it is preferable that more than 60% by weight of ammonium carboxymethylcellulose is contained relative to the total amount of the binder. If the content is less than this range, the writing characteristic and the coloring power is not sufficient in high humidity.

Because the carboxymethylcellulose acid is water-insoluble, the non-calcined lead of a colored pencil containing carboxymethylcellulose acid (CMC acid) can prevent the deterioration of the writing characteristic and the coloring power even in high humidity and at the same time, it can prevent swelling of the lead and thus, break of a wood shaft.

However, in this case carboxymethylcellulose acid introduced directly into the other raw ingredient composition does not function properly as a binder because it is water-insoluble. Therefore, ammonium carboxymethylcellulose is introduced into the raw ingredient composition first. Then, the ammonia molecule is separated from ammonium carboxymethylcellulose by heat to obtain the non-calcined lead of a colored pencil containing carboxymethylcellulose acid.

The ammonium CMC is water-soluble and is the preferable ingredient to be added to the non-calcined lead of a colored pencil. Further, when heated at 60° C. to 80° C., the ammonia molecule separates and the ammonium CMC is changed to water-insoluble CMC acid. The present invention is characterized also by adding the mentioned ammonium CMC as a raw ingredient composition to the non-calcined lead of a colored pencil.

From the reasons mentioned above, the preferable method for preparation of the non-calcined lead of a colored pencil in the present invention is that of kneading the raw ingredient composition comprising a binder comprising ammonium carboxymethylcellulose, a colorant, a body filler and a lubricant, and after the mixture is formed, heating the mixture to the temperature that forces the ammonia molecule to separate from ammonium carboxymethylcellulose.

The CMC acid to be used in the present invention has a chemical unit shown in the following formula wherein X represents hydrogen H. Generally, CMC indicates sodium carboxymethylcellulose as shown in the following formula with the X being sodium Na.

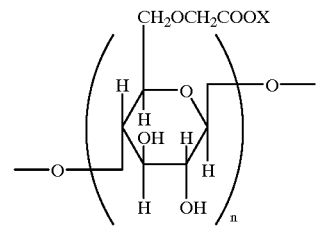

However, different from ammonium CMC, the mentioned sodium CMC does not change to the water-insoluble CMC acid with sodium salt being not separated by heat. Accordingly, in case the sodium CMC is added as a binder in the raw ingredient composition, the final product of the non-calcined lead of a colored pencil still contains the sodium CMC. Because the sodium CMC is water-soluble as mentioned above, the non-calcined lead a colored pencil containing the sodium CMC has disadvantages in that the writing characteristic and coloring power deteriorate in high humidity and the wood shaft easily breaks because of the swell of the lead. On the other hand, the non-calcined lead of a colored pencil of the present invention containing CMC acid is water-insoluble and therefore, can prevent the deterioration of the writing characteristic and the coloring power and also prevent the swell of the lead.

As can be understood from the above, the CMC acid used in the present invention is not the generally called CMC: sodium CMC. The ammonium CMC is used as a raw ingredient and the final product of the non-calcined lead of a colored pencil contains as a binder the CMC acid generated by the separation of ammonium molecular from the ammonium CMC.

When that water-soluble ingredients such as sodium carboxymethylcellulose, polyvinyl alcohol, methylcellulose are used as a binder, the writing characteristic and the coloring power deteriorate and further the lead swells because they are water-soluble. However, when they are used together with the mentioned CMC acid, the water-resistant property of a whole binder is improved and then the writing characteristic and the coloring power, further preventive effect for swelling of the lead are improved.

(Lubricant)

A lubricant is added for giving the lubricity at writing and the lubricant to be used in the present invention should be excellent in lubricity and whiteness degree. Concretely, synthetic mica, boron nitride, graphite fluoride are preferable to be used and particularly, the synthetic mica and the boron nitride is the most preferable.

Specifically, when the synthetic mica is used as a lubricant, the non-calcined lead of a colored pencil exhibits excellent writing characteristic, coloring power and mechanical strength and moreover, production cost reduces also. Accordingly, in the present invention, the synthetic mica is used preferably as a lubricant.

The synthetic mica used in the present invention has a good cleavage property. When the synthetic mica is used as a lubricant in the non-calcined lead of a colored pencil, it gives the proper hardness to the lead and improves writing characteristic at writing, with the tip of the lead cleavages when rubbed with the written surface.

The above-mentioned synthetic mica indicates the fluorine mica mineral group formed artificially and it is different from natural mica. Its construction is for example, stratified compound wherein the water of crystallization contained in natural mica is replaced with fluorine. It is easy to separate between its layers and thus has a good cleavage property. Concretely, the non-swelling mica such as fluoro mica minerals and potassium tetrasilicic mica, and the swelling mica such as sodium tetrasilicic mica, sodium or lithium taeniolite and sodium or lithium hectorite may be exemplified.

The mentioned swelling mica indicates mica that swells taking in water molecules between its layers when water exists together. On the other hand, the non-swelling mica indicates synthetic mica that never swells with water.

Among the synthetic mica, both non-swelling mica and swelling mica can be used. However, the swelling mica is more preferable to be used as a lubricant in the present invention because it gives better writing characteristic and coloring power.

Still, swelling mica that swells with wax, fats and oils is not applicable to the present invention because it swells with wax, fats and oils contained in the lead itself and lowers the strength of the lead.

Examples of synthetic mica include "DMA-350" trade name of a product available from Topy Industries Limited and the like. This synthetic mica is preferable because it has a low cost because it can be made artificially and has stable and even property and quality.

In the present invention, as a lubricant, the above-mentioned synthetic mica can be used either alone or with the other lubricant such as graphite fluoride and boron nitride, for example. When the synthetic mica is used instead of the conventional boron nitride or used together with boron nitride, the mechanical strength of the non-calcined lead of a colored pencil is increases and the break of the lead can be prevented.

Example of boron nitride includes the "UHP-S1" trade name of the product available from SHOWA DENKO Co.,Ltd, however it is not limited by this example.

Even though the swelling mica, which swells with water, is used, if the CMC is contained as a binder having a higher water-resistance than sodium CMC, the resultant lead withstands dampness well.

The content of the lubricant is not specifically limited. The preferable content of the lubricant, more particularly the synthetic mica, is 1% to 15% by weight relative to the total amount of the raw ingredient composition (solid content). When the content is less than 1% by weight relative to the total amount of the raw ingredient composition (solid content), the lubricity of the lead is not enough and the writing characteristic deteriorates. On the other hand, when the content exceeds 15% by weight relative to the total raw ingredient composition (solid content), the lead slips too much on the paper and the writing characteristic deteriorates. Further, the lead has difficulty in forming a rich writing portion on the paper.

In case the synthetic mica mixed with the boron nitride is used, the mechanical strength and cost-performance of the non-calcined lead of a colored pencil can be improved because the content of the boron nitride is reduced.

From the reasons stated above, the non-calcined lead of a colored pencil of the present invention containing the synthetic mica as a lubricant has better mechanical strength and seldom breaks compared to that containing the boron nitride. Such a non-calcined lead has also an excellent cost-performance because the synthetic mica is cheaper than the boron nitride. Further, such a lead can maintain the same level of writing characteristic and coloring power compared to that containing the boron nitride.

(Colorant)

Applicable as a colorant to be used is the conventional inorganic pigment and organic pigment. It can be used either alone or as a mixture. A pearl pigment, a fluorescent pigment, metallic powder pigment and the like can be used. The content of the colorant is 5% by weight to 25% by weight, and preferably, 10% by weight to 20% by weight relative to the total amount of the raw ingredient composition (solid content). If the content is more than 25% by weight, the writing characteristic deteriorates. On the other hand, if the content is less than 5% by weight, the color development is not sufficient.

(Other ingredients)

In the present invention, a solvent can be used to smooth the kneading and forming. Various solvent such as water or alcohol solvent can be used, either alone or as a mixture. The most preferable solvent to be used is water. The solvent is introduced to the ingredients and kneaded together. After the lead is formed, the solvent is removed by drying. The content of such a solvent is not specifically limited. Further, various additives such as perfume may also be added.

It is preferable to add the dispersant together with the colorant and the body filler. Examples of such dispersant include a known anionic surfactant, cationic surfactant, amphoteric surfactant, non-ionic surfactant and the like.

(Production method)

To make the non-calcined lead of a colored pencil containing the mentioned two surfactants having low H.L.B. value and high H.L.B. value respectively, first sorbitan fatty acid ester having H.L.B. value of not less than 1 less than 9, polyoxyethylene sorbitan fatty acid ester having H.L.B. value of not less than 9 nor more than 20 and water are introduced into wax, fats and oils to prepare an O/W emulsion of wax, fats and oils. This O/W emulsion is added to the composition comprising the colorant, the body filler, the binder and the solvent and the resultant mixture is kneaded. The kneaded ingredient composition is formed by extrusion using a plunger extruder or screw extruder. The mentioned water is removed by drying to obtain the non-calcined lead of a colored pencil.

In addition, the preparation of O/W emulsion may be omitted and wax, fats and oils, sorbitan fatty acid ester having H.L.B. value of not less than 1 less than 9 and polyoxyethylene sorbitan fatty acid ester having H.L.B. value of not less than 9 nor more than 20 may be added directly to the ingredient composition comprising the colorant, the body filler, the binder and the solvent and the resultant mixture is kneaded. The kneaded ingredient composition is formed by extrusion using a plunger extruder or screw extruder. The mentioned water is removed by drying to obtain the non-calcined lead of a colored pencil.

In case of the non-calcined lead of a colored pencil with excellent erasability with rubber eraser comprising an O/W emulsion containing the oily substance that is liquid at room temperature and the surfactant having H.L.B. value of not less than 7 nor more than 18 and water, the lead is prepared in the following method: The binder or its solution is added to the mixture of the colorant, body filler, and solvent as required. The resultant mixture is kneaded and the mentioned solvent is removed. The O/W emulsion comprising the oily substance that is liquid at room temperature, surfactant having H.L.B. value of not less than 7 nor more than 18 and water is introduced herein and mixed together. After the water contained in the O/W emulsion, and if some remains, the mentioned solvent are removed to obtain the non-calcined lead of a colored pencil.

In the production of the present non-calcined lead of a colored pencil, at first, a binder or its solution is added to the mixture containing a colorant, a body filler, and a solvent. Then the resultant mixture is kneaded and the mentioned solvent is removed. For removing the solvent, various methods such as heating or drying may be applied, as same as the mentioned removing method after forming. Regarding to removing the solvent from the mentioned mixture, it is the most preferable that a part of solvent, particularly, a part of water is still contained, that is, the raw ingredients composition is still water-containing. On the otherhand,the solvent remains after forming and the water contained in the O/W emulsion should be removed perfectly.

The non-calcined lead of a colored pencil of the present invention may also be made by the following process though the above-mentioned process is the most preferable: The raw ingredients is kneaded together at first. The solvent can be added at that time if required. The kneaded ingredients are extruded by a plunger or screw extruder and formed to be a lead of pencil. Then the solvent is removed by drying (24 hours at about 40° C.) in case any solvent is used. The lead is heated at 60° C. to 80° C. for 12 hours, and after that, is impregnated with fats and oils, and/or wax.

In case of a non-calcined lead of a colored pencil containing CMC acid, it is possible to omit the drying step from the above-mentioned process. For example, the ammonium molecular is removed in one step with drying the formed lead by heating gradually.

EXAMPLES

The present invention will be further detailed by way of the following examples thereof, but the present invention will not be limited by these examples.

(Non-calcined lead of a colored pencil containing an oily substance and a surfactant having H.L.B. value of not less than 7 nor more than 18)

The non-calcined lead of a colored pencil of Example 1 is prepared in the following process using the raw ingredients (composition) shown in the Table 1 (Each amount of the raw ingredients is % by weight).

The composition comprising Pigment Black 7 (available from Mitsubishi Kasei Corporation under the trade name of "PRINTEX G") used as a pigment, Pigment White 26 (available from NIPPON TALC CO.,LTD. under the trade name of "MICROACE P-4") as a body filler, trade name "LAVELINE FW" (available from Dai-ichi Kogyo Seiyaku Co., LTD.) as a dispersant and a synthetic mica (available from Topy Industries LTD. under the trade name of "DMA-350") as a lubricant is kneaded by a kneading machine with water of the same amount as that of the whole composition. Then, methylhydroxyethyl cellulose (available from Clariant Co.,Ltd. under the trade name of "Tylose MH200YP2") is introduced into the resultant dispersion and mixed together. This mixture is heated to remove the water.

Then, the OW emulsion containing the liquid paraffin (available from SANKOU CHEMICALS IND.,CO.,LTD. under the trade name of "white mineral oil"), sorbitan sesquioleate (having H.L.B. value of 3.7, available from Nikko Chemicals Co.,Ltd. under the trade name of "SO-15"), polyoxyethylene sorbitan monooleate ( having Number of additional moles of ethylene oxide chain: n=20 mol H.L.B. value of 15.0 available from Nikko Chemicals Co., Ltd. under the trade name of "TO-10") and water is introduced into this composition and kneaded with a kneading machine. This kneaded ingredient composition, when containing less than 13% of water, is extruded and formed into colored pencil lead with diameter of 3 mm by a plunger extruder. The mentioned water is removed by drying to obtain a non-calcined lead of a colored pencil.

TABLE 1

| | | [% by weight] | | |
|---|---|---|---|---|
| | | Example | | Comparative example |
| | | 1 | 1 | 2 |
| Raw composition (solid content) | Methylhydroxyethyl cellulose | 5.0 | 5.0 | 5.0 |
| | Pigment White 26 | 71.0 | 74.6 | 71.0 |
| | Synthetic mica | 4.0 | 4.0 | 4.0 |

TABLE 1-continued

[% by weight]

|  |  | Example 1 | Comparative example 1 | Comparative example 2 |
|---|---|---|---|---|
|  | Pigment Black 7 | 7.0 | 7.0 | 7.0 |
|  | Dispersant | 0.5 | 0.5 | 0.5 |
|  | Sorbitan sesquioleate | 2.4 | — | 2.4 |
|  | Polyoxyethylene sorbitan monooleate | 1.2 | — | 1.2 |
|  | Liquid paraffin | 8.9 | 8.9 | 8.9 |
|  | Total | 100 | 100 | 100 |
| Physical properties | Mechanical strength (MPa) | 25.1 | 9.4 | 11.6 |
|  | Coloring power | ○ | X | ○ |
|  | Forming performance | ○ | X | X |
|  | Erasability with a rubber eraser | ○ | X | X |

The O/W emulsion used in the Example 1 is prepared in a following method:

As shown in the Table 2, the liquid paraffin (available from SANKOU CHEMICALS IND.,CO.,LTD., under the trade name of "white mineral oil"), sorbitan sesquioleate (having H.L.B. value of 3.7, available from Nikko Chemicals Co.,Ltd, under the trade name of "SO-15"), and polyoxyethylene sorbitan monooleate (having Number of additional moles of ethylene oxide chain: n=20 mol H.L.B. value of 15.0 available from Nikko Chemicals Co.,Ltd, under the trade name of "TO-10") are mixed together and heated up to 80° C. Then, water heated up to 80° C. is added to this mixture of 80° C. little by little and is allowed to cool down to room temperature with stirring to obtain the O/W emulsion.

TABLE 2

[% by weight]

| sorbitan sesquioleate | 4.00 |
|---|---|
| polyoxyethylene sorbitan monooleate | 2.00 |
| Liquid paraffin | 30.00 |
| Water | 64.00 |

The comparative example 1 contains the same ingredients as Example 1 except sorbitan sesquioleate and polyoxyethylene sorbitan monooleate, as shown in the Table 1. The non-calcined lead of a colored pencil is obtained in a following method.

The composition comprising Pigment Black 7 (available from Mitsubishi Kasei Corporation under the trade name of "PRINTEX G") used as a pigment, Pigment White 26 (available from NIPPON TALC CO.,LTD. under the trade name of "MICROACE P-4") as a body filler, Trade name "LAVELINE FW" (available from Dai-ichi Kogyo Seiyaku Co., LTD.) as a dispersant, a synthetic mica (available from Topy Industries LTD. under the trade name of "DMA-350") and sodium carboxymethylcellulose (sodium CMC, available from Clariant Co.,Ltd, under the trade name of "Tylose MH200YP2") is kneaded by a kneading machine with water of the same amount as that of the whole composition.

The liquid paraffin (available from SANKOU CHEMICALS IND.,CO.,LTD. under the trade name of "white mineral oil") is added hereto and kneaded by a kneading machine. After that, the composition with less than 13% of water contained, is extruded and formed into a lead of pencil by a plunger extruder. The mentioned water is removed by drying to obtain the non-calcined lead of the colored pencil.

The non-calcined lead of Comparative Example 2 is prepared in a following method with the raw ingredients shown in Table 1: The same O/W emulsion as used the above-mentioned Example is prepared previously and added to the composition comprising a colorant, a body filler, a water-soluble binder and water. The resultant mixture is kneaded. The kneaded ingredient composition containing less than 13% of water, is extruded and formed into a lead of pencil with its diameter of 3 mm by a plunger extruder. The water is removed to obtain the non-calcined lead of a colored pencil.

Regarding to each non-calcined leads of colored pencil prepared in Example 1, Comparative Example 1 and Comparative Example 2 as shown in Table 1, their mechanical strength, coloring power and forming performance and erasability by a rubber eraser were evaluated respectively.

(Mechanical strength)

The flexural strength (mechanical strength) was measured based on JIS S 6005. The lead was supported at both edges and its center portion was loaded. The load added at the time of the lead broke was measured and this load was substituted into the formula of JIS test method to calculate the flexural strength (MPa). The bigger number means that the lead has more flexural strength and is difficult to be broken.

(Coloring power)

10 person wrote something on a drawing paper with each colored pencil prepared in Examples and Comparative Examples and evaluated the coloring power of each colored pencil. The number of Example and Comparative Examples on those pencils were covered. Then, the coloring power was evaluated generally on the following basis. This general evaluation of the coloring power is shown in Table 1.

⊚: 10 persons out of 10 evaluated that the coloring power was good enough.

○: 9 or 8 person evaluated that the coloring power was good enough.

Δ: 5 to 7 person evaluated that the coloring power was good enough.

X: Less than 4 person evaluated that the coloring power was good.

(Forming performance)

X: more than 40% of leads broke into pieces at the time of forming or drying.

○: Less than 35% of leads broke into pieces at the time of forming or drying.

Δ: 35% to 40% of leads broke into pieces at the time of forming or drying.

(Erasability with a rubber eraser)

The erasability with a rubber eraser was evaluated with the writing portion on the drawing paper made by each of colored pencils prepared in Example and Comparative Examples. The number of Examples and Comparative Examples on those pencils were covered. The eraser used in this test was that available from Rabbit Co., LTD. under the trade name of "RC-60". Then, the erasability with a rubber eraser was evaluated on the following basis. This evaluation is shown in Table 1.

○: The erasability with a rubber eraser was excellent.

X: the erasability with a rubber eraser was not so good or bad.

As can be understood from Table 1, the non-calcined lead of a colored pencil of Example is excellent in coloring power, mechanical strength and forming performance while having better erasability compared to those of Comparative Examples.

The non-calcined lead of a colored pencil of the present Example can be obtained with easy process without conventional oil immersion process because it is prepared by the following method: First, a binder or its solution is added to the mixture comprising a colorant, a body filler, and a solvent if required. The resultant mixture is kneaded and after that, the mentioned solvent is removed. Then, O/W emulsion comprising the oily substance that is liquid at room temperature, one or more surfactant(s) having H.L.B. value of not less than 7 nor more than 18 and water is introduced herein and mixed together. After the mixed ingredient composition is formed, the mentioned solvent and the water contained in the O/W emulsion are removed to obtain a non-calcined lead of a colored pencil. This non-calcined lead of a colored pencil is also excellent in coloring power, mechanical strength and forming performance. Further, its writing portion formed on a paper comprises the colorant particles and the body filler particles both covered with the binder, not covered with the oily substance that is liquid at room temperature and therefore the excellent erasability by a rubber eraser exhibits.

(Non-calcined lead of a colored pencil containing surfactants having low H.L.B. value and high H.L.B. value respectively)

The non-calcined leads of a colored pencil were prepared in the following method using those ingredients (% by weight)shown in Table 3.

The composition comprising sodium carboxymethylcellulose (CMC Na available from HOECHST Inc. under the trade name of "Tylose C30"), talc (available from NIPPON TALC CO.,LTD. under the trade name of "MICROASE P-4"), C.I.PR48:3 as a pigment (available from NOMA CHEMICAL IND.CO.,LTD. under the trade name of "Red SR-200P") and synthetic mica (available from Topy Industries Limited under the trade name of "DMA-350") was kneaded with a solvent by a kneading machine. As a solvent the water of the same amount as that of the composition was used.

The liquid paraffin (available from SANKOU CHEMICALS IND.,CO.,LTD. under the trade name of "white mineral oil"), sorbitan sesquioleate (having H.L.B. value of 3.7, available from Nikko Chemicals Co., Ltd, under the trade name of "SO-15"), and polyoxyethylene sorbitan monooleate (Number of additional moles of ethylene oxide chain: n=20 mol, H.L.B. value: 15.0 available from Nikko Chemicals Co., Ltd, under the trade name of "TO-10") were added hereto and kneaded by a kneading machine. After that, the raw composition with less than 12% of water contained, was extruded and formed into a lead of a pencil with its diameter being 3 mm by a plunger extruder. The mentioned water was removed by drying to obtain the non-calcined lead of a colored pencil.

TABLE 3

| | % by weight | | | | | | | | | |
|---|---|---|---|---|---|---|---|---|---|---|
| | Example | | | | | Comparative example | | | | |
| | 2 | 3 | 4 | 5 | 6 | 3 | 4 | 5 | 6 | 7 |
| Raw composition (solid content) | | | | | | | | | | |
| sodium carboxymethyl cellulose | 3.63 | 3.63 | 3.63 | 3.63 | 3.63 | 3.63 | 3.63 | 3.63 | 3.63 | 3.63 |
| Talc | 72.58 | 72.58 | 71.59 | 71.59 | 71.59 | 73.69 | 71.59 | 71.59 | 72.94 | 61.69 |
| Synthetic mica | 2.58 | 2.58 | 2.58 | 2.58 | 2.58 | 2.58 | 2.58 | 2.58 | 2.58 | 2.58 |
| C.I. PR 48:3 | 14.54 | 14.54 | 14.54 | 14.54 | 14.54 | 14.54 | 14.54 | 14.54 | 14.54 | 14.54 |
| Sorbitan sesquioleate | 0.74 | 0.74 | 1.37 | 1.40 | 1.47 | — | 1.89 | 1.05 | 0.50 | 8.00 |
| polyoxyethylene sorbitan monooleate | 0.37 | 0.37 | 0.74 | 0.70 | 0.63 | — | 0.21 | 1.05 | 0.25 | 4.00 |
| Liquid paraffin | 5.55 | 5.55 | 5.55 | 5.55 | 5.55 | 5.55 | 5.55 | 5.55 | 5.55 | 5.55 |
| Total | 100 | 100 | 100 | 100 | 100 | 100 | 100 | 100 | 100 | 100 |
| Physical properties | | | | | | | | | | |
| Mechanical strength (MPa) | 21.08 | 22.57 | 21.56 | 23.98 | 22.99 | 14.50 | 15.49 | 14.72 | 16.43 | 24.90 |
| Coloring power | ○ | ○ | ○ | ⊙ | ○ | x | ○ | ○ | Δ | x |
| Forming performance | ○ | ○ | ○ | ○ | ○ | x | Δ | Δ | Δ | ○ |

In addition, Example 3 has the same components as Example 2, however the preparation method is different from the other Examples and Comparative Examples. The following O/W emulsion was prepared previously and added to the composition comprising the colorant, the body filler, the binder and the solvent. The resultant mixture was kneaded and this kneaded raw ingredient composition containing less than 12% of water was extruded and formed by a plunger extruder. The mentioned water was removed by drying to obtain a non-calcined lead of a colored pencil.

The O/W emulsion of Example 3 was prepared in a following method:

The liquid paraffin (available from SANKOU CHEMICALS IND.,CO.,LTD. under the trade name of "white mineral oil"), sorbitan sesquioleate (having H.L.B. value of 3.7, available from Nikko Chemicals Co.,Ltd. under the trade name of "SO-15"), and polyoxyethylene sorbitan monooleate (Number of additional moles of ethylene oxide chain: n=20 mol, H.L.B. value: 15 available from Nikko Chemicals Co., Ltd. under the trade name of "TO-10") were mixed together in a proportion shown in Table 4 and heated up to 80° C. Then, water heated up to 80° C. is added to this mixture of 80° C. little by little and was allowed to cool down to room temperature with stirring to obtain the O/W emulsion.

TABLE 4

| [% by weight] | |
| --- | --- |
| Sorbitan sesquioleate | 4.00 |
| Polyoxyethylene sorbitan monooleate | 2.00 |
| White mineral oil | 30.00 |
| Water | 64.00 |

Regarding to each non-calcined lead of a colored pencil prepared in Examples and Comparative Examples shown in Table 3, their mechanical strength, coloring power and forming performance were evaluated respectively.

(Mechanical strength)

The flexural strength (mechanical strength) was measured based on JIS S 6005. The lead was supported at both edges and its center portion was loaded. The load added at the time of the lead breaks was measured and this load was substituted into the formula of JIS test method to calculate the flexural strength (MPa). The bigger number means that the lead has more flexural strength and is difficult to be broken.

(Coloring power)

10 person wrote something on a drawing paper with each colored pencil prepared in Examples and Comparative Examples and evaluated the coloring power of each colored pencil. The number of Examples and Comparative Examples on those pencils were covered. Then, the coloring power was evaluated generally on the following basis. This general evaluation of the coloring power is shown in Table 3.

⊚: 10 persons out of 10 evaluated that the coloring power was good enough.

○: 9 or 8 person evaluated that the coloring power was good enough.

Δ: 5 to 7 person evaluated that the coloring power was good enough.

X : Less than 4 person evaluated that the coloring power was good enough.

(Forming performance)

X; more than 40% of leads broke into pieces at the time of forming or drying.

Δ: 35% to 40% of leads broke into pieces at the time of forming or drying.

○: Less than 35% of leads broke into pieces at the time of forming or drying.

As can be understood from Table 3, compared with the Comparative example 3, which is a conventional colored pencil lead without sorbitan sesquioleate and polyoxyethylene sorbitan monooleate, the colored pencil lead of Examples containing and the other Comparative Examples sorbitan sesquioleate and polyoxyethylene sorbitan monooleate are improved in the coloring power, mechanical strength and forming-performance.

Specifically, in the Examples 2–6 that contain sorbitan sesquioleate and polyoxyethylene sorbitan monooleate in ratio of 0.65–0.7 parts of the former to 0.35–0.3 parts of the latter, exhibited remarkably improved coloring power, mechanical strength and forming performance.

On the other hand, in the Comparative Example 4 containing sorbitan sesquioleate and polyoxyethylene sorbitan monooleate in ratio of 0.9 parts of the former to 0.1 parts of the latter, and the Comparative Example 5 containing them in the ratio of 0.5 parts of the former to 0.5 parts of the latter, the coloring power was improved, however the mechanical strength and forming performance were not improved well.

In comparative Example 6 containing less than 1% of total amount of sorbitan sesquioleate and polyoxyethylene sorbitan monooleate, the coloring power, mechanical strength and forming performance was not particularly improved. On the other hand, with the Examples, wherein the content of them is not less than 1% by weight, the coloring power, mechanical strength and forming performance were improved remarkably.

In Comparative Example 7 that include excess amount of sorbitan sesquioleate and polyoxyethylene sorbitanmonooleate, the coloring power deteriorates.

As can be understood from the above, the non-calcined lead of a colored pencil of the present invention has an improved coloring power together with excellent mechanical strength and forming performance even though containing wax, fats and oils that is liquid at room temperature such as a liquid paraffin. It is because the present invention containing the colorant, the body filler, the binder and wax, fats and oils and further including surfactants having a H.L.B. value of not less than 1 less than 9 and not less than 9 nor more than 20, preferably, sorbitan fatty acid ester having a H.L.B. value of not less than 1 less than 9 and polyoxyethylene sorbitan fatty acid ester having a H.L.B. value of not less than 9 nor more than 20, more preferably sorbitan sesquioleate and polyoxyethylene sorbitan monooleate.

(Non-calcined lead of a colored pencil containing synthetic mica)

The non-calcined leads of a colored pencil of Examples and Comparative Examples were prepared with those components shown in Table 5. The components shown in Table 5 (% by weight) were kneaded with the same amount of solvent (water and organic solvent). It was formed to a lead with its diameter of 3 mm by a plunger extruder and then, the mentioned solvent was removed by drying. After it was heated at 70° C. for 12 hours, the liquid paraffin was impregnated to obtain the colored pencil lead.

In Table 5, Examples 7–11 and Comparative Examples 12 and 13 used a synthetic mica as a lubricant, Comparative Examples 8–10 used boron nitride as a lubricant and Comparative Example 11 didn't include synthetic mica nor boron nitride.

TABLE 5

| | % by weight | | | | | | | | | | |
| --- | --- | --- | --- | --- | --- | --- | --- | --- | --- | --- | --- |
| | Example | | | | | Comparative Example | | | | | |
| | 7 | 8 | 9 | 10 | 11 | 8 | 9 | 10 | 11 | 12 | 13 |
| Sodium CMC | 5.0 | 5.0 | 5.0 | 5.0 | 5.0 | 5.0 | 5.0 | 5.0 | 5.0 | 5.0 | 5.0 |
| Talc | 72.0 | 70.0 | 65.0 | 74.0 | 60.0 | 70.0 | 70.0 | 65.0 | 75.0 | 74.5 | 55.0 |
| Synthetic mica | 3.0 | 5.0 | 10.0 | 1.0 | 15.0 | — | — | — | — | 0.5 | 20.0 |

TABLE 5-continued

| | % by weight | | | | | | | | | |
|---|---|---|---|---|---|---|---|---|---|---|
| | Example | | | | | Comparative Example | | | | | |
| | 7 | 8 | 9 | 10 | 11 | 8 | 9 | 10 | 11 | 12 | 13 |
| Boron nitride | — | — | — | — | — | 5.0 | 5.0 | 10.0 | — | — | — |
| Watchung red Sr | 20.0 | — | — | 20.0 | 20.0 | 20.0 | — | — | 20.0 | 20.0 | 20.0 |
| Phthalocyanine blue | — | 20.0 | — | — | — | — | 20.0 | — | — | — | — |
| Hansa yellow 10G | — | — | 20.0 | — | — | — | — | 20.0 | — | — | — |
| Total | 100.0 | 100.0 | 100.0 | 100.0 | 100.0 | 100.0 | 100.0 | 100.0 | 100.0 | 100.0 | 100.0 |
| Coloring power | ○ | ○ | ○ | ○ | ○ | ○ | ○ | ○ | x | Δ | Δ |
| Writing characteristic | ○ | ○ | ○ | ○ | ○ | ○ | ○ | ○ | x | Δ | Δ |
| Flexural strength (MPa) | 41.84 | 40.93 | 41.38 | 40.58 | 41.49 | 35.02 | 35.47 | 36.47 | 36.38 | 38.20 | 41.56 |

In Table 5, sodium CMC is available from Daicel Chemical Industries, LTD. under the trade name of "CMC 1130", talc is available from NIPPON TALC CO.,LTD. under the trade name of "MICROACE P-4", the boron nitride is available from Showa Denko Co.,Ltd under the trade name of "UHP-S1", a synthetic mica is available from Topy Industries Limited under the trade name of "DMA-350", a red colorant is Watchung red Sr (C.I. PR 48:3), a blue colorant is Phthalocyanine blue (C.I. PB 15), a yellow colorant is Hansa yellow 10 G (C.I. PY 3).

(Mechanical strength)

The flexural strength (mechanical strength) was measured based on JIS S 6005. The lead was supported at both edges and its center portion was loaded. The load added at the time of the lead broke is measured and this load was substituted into the formula of JIS test method to calculate the flexural strength (MPa). The bigger number means that the lead has more flexural strength and is difficult to be broken.

(Writing characteristic)

The writing characteristic of each non-calcined lead of a colored pencil prepared in the above-mentioned Examples and Comparative Examples were evaluated as mentioned above. 10 person wrote something on a drawing paper with each colored pencil prepared in Examples and Comparative Examples and evaluated the writing characteristic of each colored pencil. The number of Examples and Comparative Examples on those pencils were covered. Then, the writing characteristic was evaluated generally on the following basis. This general evaluation of the writing characteristic is shown in Table 5.

○: More than 8 person evaluated that the writing characteristic was good enough.
Δ: 5 to 7 person evaluated that the writing characteristic was good enough.
X : Less than 4 person evaluated that the writing characteristic was good enough.

(Coloring power)

The coloring power of each non-calcined lead of a colored pencil prepared in the above-mentioned Examples and Comparative Examples was evaluated. 10 person wrote something on a drawing paper with each colored pencil prepared in Examples and Comparative Examples and evaluated the coloring power of each colored pencil. The number of Examples and Comparative Examples on those pencils were covered. Then, the coloring power was evaluated generally on the following basis. This general evaluation of the coloring power was shown in Table 5.

○: More than 8 person evaluated that the coloring power was good enough.
Δ: 5 to 7 person evaluated that the coloring power was good enough.
X: Less than 4 person evaluated that the coloring power was good enough.

From the result of the above-mentioned test, each non-calcined lead of a colored pencil containing the synthetic mica prepared in Examples 7 to 11 and the Comparative Examples 12 and 13 has improved mechanical strength and does not break easily compared to those containing the boron nitride.

Each non-calcined lead of a colored pencil containing the synthetic mica prepared in Examples 7 to 11 exhibits the same level of writing characteristic and coloring power as those of the Comparative Examples 8 to 10.

With both Comparative Example 12 wherein the content of the synthetic mica is less than 1% by weight relative to the total amount of ingredients composition (solid content) and Comparative Example 13 wherein the content exceeds 15% by weight relative to the total amount of ingredients composition (solid content), the writing characteristic and the coloring power are at least better than that of Comparative Example 11 that does not contain synthetic mica. However, compared with the non-calcined lead of Comparative Examples 8–10 containing the boron nitride, the writing characteristic and the coloring power of Example 12 and Example 13 is inferior though they can be used in practice.

From the reasons stated above, it was found that to prepare a non-calcined lead having the same level of writing characteristic and coloring power as conventional non-calcined lead containing the boron nitride, the preferable content of the synthetic mica should be 1% by weight to 15% by weight relative to the total amount of the ingredients composition (solid content).

In addition, the non-calcined lead prepared in Comparative Example 11 wherein neither synthetic mica nor boron nitride was used, cannot be applied to practical use because the writing characteristic and the coloring power are not sufficient.

The non-calcined lead of the present Example comprises the binder, the colorant, the body filler and the lubricant as raw ingredient composition and further includes wax and/or oils and fats as required, and the synthetic mica as a lubricant. Therefore, it has an improved mechanical strength and hard to break while exhibits the same level of writing characteristic and coloring power compared with the conventional non-calcined lead of a colored pencil containing the boron nitride as a lubricant. Further, the synthetic mica is less expensive than the boron nitride and it has excellent cost-performance specifically for the non-calcined lead of a colored pencil that needs to be provided at relatively low price.

(Non-calcined lead of a colored pencil containing the specific body filler)

A non-calcined lead of a colored pencil is prepared compounding the ingredients shown in Table 6 to Table 12. The ingredients (% by weight) shown in Table 6 to Table 12 is kneaded with the same amount of solvent (water) and formed with an extruder. After the solvent is removed by drying, the lead is impregnated with the liquid paraffin to prepare each of non-calcined leads of Examples and Comparative Examples.

The ingredients used in Examples and Comparative Examples are as follows:

Sodium carboxymethylcellulose: available from Daicel Chemical Industries, Ltd. under the trade name of "DAICEL CMC 1130"

Talc: available from NIPPON TALC CO.,LTD. under the trade name of "MICROACE P-4"

Wollastonite: available from WOLKEM, under the trade name of "HYCON A-60".

Attapulgite: available from ENGELHARD CORPORATION under the trade name of "ATTAGEL 40".

Halloysite kaolin: available from Tsuchiya Kaolin Ind., Ltd. under the trade name of "NIADO 400".

Sepiolite: available from NIPPON TALC CO.,LTD. under the trade name of "SEPIOLITE S"

Boron nitride: available from Showa Denko Co.,Ltd under the trade name of "UHP-S1"

Watchung red Sr: C.I. PR 48:3

Phthalocyanine green: C.I.PG 7

Ultramarine: C.I. PB 29

TABLE 6

% by weight

| | Example | | | | | | | |
|---|---|---|---|---|---|---|---|---|
| | 12 | 13 | 14 | 15 | 16 | 17 | 18 | 19 |
| Sodium carboxy-methylcellulose | 6.0 | 6.0 | 6.0 | 5.1 | 5.1 | 5.1 | 6.1 | 6.0 |
| Talc | 69.5 | 69.5 | 69.5 | 63.3 | 63.3 | 63.3 | 73.4 | 53.3 |
| Wollastonite | 5.6 | 5.6 | 5.6 | 6.3 | 6.3 | 6.3 | 1.0 | 20.0 |
| Attapulgite | — | — | — | — | — | — | — | — |
| Halloysite kaolin | — | — | — | — | — | — | — | — |
| Sepiolite | — | — | — | — | — | — | — | — |
| Boron nitride | 5.6 | 5.6 | 5.6 | 6.3 | 6.3 | 6.3 | 5.3 | 5.3 |
| Watchung red Sr | 13.3 | — | — | 12.7 | — | — | 13.7 | 10.0 |
| Phthalocyanine green | — | 13.3 | — | — | 12.7 | — | — | — |
| Ultramarine | — | — | 13.3 | — | — | 12.7 | — | — |
| White vaseline | — | — | — | 6.3 | 6.3 | 6.3 | — | 5.3 |
| Writing characteristic | ○ | ○ | ○ | ○ | ○ | ○ | ○ | ○ |
| Mechanical strength | 37.6 | 35.9 | 31.8 | 33.3 | 31.4 | 33.2 | 22.6 | 38.2 |

TABLE 7

% by weight

| | Example | | | | | | | |
|---|---|---|---|---|---|---|---|---|
| | 20 | 21 | 22 | 23 | 24 | 25 | 26 | 27 |
| Sodium carboxy-methylcellulose | 6.0 | 6.0 | 6.0 | 5.1 | 5.1 | 5.1 | 6.1 | 6.0 |
| Talc | 69.5 | 69.5 | 69.5 | 63.3 | 63.3 | 63.3 | 71.7 | 53.3 |
| Wollastonite | — | — | — | — | — | — | — | — |
| Attapulgite | 5.6 | 5.6 | 5.6 | 6.3 | 6.3 | 6.3 | 2.7 | 20.0 |
| Halloysite kaolin | — | — | — | — | — | — | — | — |
| Sepiolite | — | — | — | — | — | — | — | — |
| Boron nitride | 5.6 | 5.6 | 5.6 | 6.3 | 6.3 | 6.3 | 5.8 | 5.3 |
| Watchung red Sr | 13.3 | — | — | 12.7 | — | — | 13.7 | 10.0 |
| Phthalocyanine green | — | 13.3 | — | — | 12.7 | — | — | — |
| Ultramarine | — | — | 13.3 | — | — | 12.7 | — | — |
| White vaseline | — | — | — | 6.3 | 6.3 | 6.3 | — | 5.3 |
| Writing characteristic | ○ | ○ | ○ | ○ | ○ | ○ | ○ | ○ |
| Mechanical strength | 35.8 | 34.9 | 36.2 | 32.7 | 31.8 | 33.3 | 20.3 | 36.5 |

TABLE 8

% by weight

| | Example | | | | | | | |
|---|---|---|---|---|---|---|---|---|
| | 28 | 29 | 30 | 31 | 32 | 33 | 34 | 35 |
| Sodium carboxy-methylcellulose | 6.0 | 6.0 | 6.0 | 5.1 | 5.1 | 5.1 | 6.1 | 6.0 |
| Talc | 69.5 | 69.5 | 69.5 | 63.3 | 63.3 | 63.3 | 71.7 | 53.3 |
| Wollastonite | — | — | — | — | — | — | — | — |
| Attapulgite | — | — | — | — | — | — | — | — |
| Halloysite kaolin | 5.6 | 5.6 | 5.6 | 6.3 | 6.3 | 6.3 | 2.7 | 20.0 |
| Sepiolite | — | — | — | — | — | — | — | — |
| Boron nitride | 5.6 | 5.6 | 5.6 | 6.3 | 6.3 | 6.3 | 5.3 | 5.3 |
| Watchung red Sr | 13.3 | — | — | 12.7 | — | — | 13.7 | 10.0 |
| Phthalocyanine green | — | 13.3 | — | — | 12.7 | — | — | — |
| Ultramarine | — | — | 13.3 | — | — | 12.7 | — | — |
| White vaseline | — | — | — | 6.3 | 6.3 | 6.3 | — | 5.3 |
| Writing characteristic | ○ | ○ | ○ | ○ | ○ | ○ | ○ | ○ |
| Mechanical strength | 36.5 | 35.3 | 37.0 | 30.9 | 32.3 | 31.6 | 21.8 | 37.2 |

TABLE 9

% by weight

| | Example | | | | | | | |
|---|---|---|---|---|---|---|---|---|
| | 36 | 37 | 38 | 39 | 40 | 41 | 42 | 43 |
| Sodium carboxy-methylcellulose | 6.0 | 6.0 | 6.0 | 5.1 | 5.1 | 5.1 | 6.1 | 6.0 |
| Talc | 69.5 | 69.5 | 69.5 | 63.3 | 63.3 | 63.3 | 71.7 | 53.3 |
| Wollastonite | — | — | — | — | — | — | — | — |
| Attapulgite | — | — | — | — | — | — | — | — |
| Halloysite kaolin | — | — | — | — | — | — | — | — |
| Sepiolite | 5.6 | 5.6 | 5.6 | 5.6 | 5.6 | 5.6 | 2.7 | 20.0 |
| Boron nitride | 5.6 | 5.6 | 5.6 | 6.3 | 6.3 | 6.3 | 5.8 | 5.3 |

TABLE 9-continued

% by weight

| | Example | | | | | | | |
|---|---|---|---|---|---|---|---|---|
| | 36 | 37 | 38 | 39 | 40 | 41 | 42 | 43 |
| Watchung red Sr | 13.3 | — | — | 12.7 | — | — | 13.7 | 10.0 |
| Phthalocyanine green | — | 13.3 | — | — | 12.7 | — | — | — |
| Ultramarine | — | — | 13.3 | — | — | 12.7 | — | — |
| White vaseline | — | — | — | 6.3 | 6.3 | 6.3 | — | 5.3 |
| Writing characteristic | ○ | ○ | ○ | ○ | ○ | ○ | ○ | ○ |
| Mechanical strength | 35.8 | 34.9 | 37.2 | 32.8 | 31.2 | 33.6 | 19.8 | 36.4 |

TABLE 10

% by weight

| | Example | | | | | | | |
|---|---|---|---|---|---|---|---|---|
| | 44 | 45 | 46 | 47 | 48 | 49 | 50 | 51 |
| Sodium carboxy-methylcellulose | 6.0 | 6.0 | 6.0 | 5.1 | 5.1 | 5.1 | 6.1 | 6.0 |
| Talc | 69.5 | 69.5 | 69.5 | 63.3 | 63.3 | 63.3 | 71.7 | 53.3 |
| Wollastonite | 2.8 | — | — | 3.2 | — | — | 1.4 | 10.0 |
| Attapulgite | 2.8 | 2.8 | — | 3.2 | 3.2 | — | 1.4 | 10.0 |
| Halloysite kaolin | — | 2.8 | 2.8 | — | 3.2 | 3.2 | — | — |
| Sepiolite | — | — | 2.8 | — | — | 3.2 | — | — |
| Boron nitride | 5.6 | 5.6 | 5.6 | 6.3 | 6.3 | 6.3 | 5.8 | 5.3 |
| Watchung red Sr | 13.3 | — | — | 12.7 | — | — | 13.7 | 10.0 |
| Phthalocyanine green | — | 13.3 | — | — | 12.7 | — | — | — |
| Ultramarine | — | — | 13.4 | — | — | 12.7 | — | — |
| White vaseline | — | — | — | 6.3 | 6.3 | 6.3 | — | 5.3 |
| Writing characteristic | ○ | ○ | ○ | ○ | ○ | ○ | ○ | ○ |
| Mechanical strength | 34.7 | 37.2 | 38.8 | 31.3 | 33.6 | 35.5 | 20.8 | 35.0 |

TABLE 11

% by weight

| | Comparative Example | | | | | |
|---|---|---|---|---|---|---|
| | 14 | 15 | 16 | 17 | 18 | 19 |
| Sodium carboxy-methylcellulose | 6.3 | 6.3 | 6.3 | 5.4 | 5.4 | 5.4 |
| Talc | 73.7 | 73.7 | 73.7 | 67.6 | 67.6 | 67.6 |
| Wollastonite | — | — | — | — | — | — |
| Attapulgite | — | — | — | — | — | — |
| Halloysite kaolin | — | — | — | — | — | — |
| Sepiolite | — | — | — | — | — | — |
| Boron nitride | 6.0 | 6.0 | 6.0 | 6.8 | 6.8 | 6.8 |
| Watchung red Sr | 14.0 | — | — | 13.5 | — | — |
| Phthalocyanine green | — | 14.0 | — | — | 13.5 | — |
| Ultramarine | — | — | 14.0 | — | — | 13.5 |
| White vaseline | — | — | — | 6.8 | 6.8 | 6.8 |
| Writing characteristic | ○ | ○ | ○ | ○ | ○ | ○ |
| Mechanical strength | 10.3 | 11.9 | 12.3 | 11.3 | 9.3 | 11.9 |

TABLE 12

% by weight

| | Comparative Example | | | | | | | |
|---|---|---|---|---|---|---|---|---|
| | 20 | 21 | 22 | 23 | 24 | 25 | 26 | 27 |
| Sodium carboxy-methylcellulose | 6.0 | 6.0 | 6.0 | 6.0 | 6.0 | 6.0 | 6.0 | 6.0 |
| Talc | 74.6 | 54.1 | 74.6 | 54.1 | 74.6 | 54.1 | 74.6 | 54.1 |
| Wollastonite | 0.5 | 21.0 | — | — | — | — | — | — |
| Attapulgite | — | — | 0.5 | 21.0 | — | — | — | — |
| Halloysite kaolin | — | — | — | — | 0.5 | 21.0 | — | — |
| Sepiolite | — | — | — | — | — | — | 0.5 | 21.0 |
| Boron nitride | 5.6 | 5.6 | 5.6 | 5.6 | 5.6 | 5.6 | 5.6 | 5.6 |
| Watchung red Sr | 13.3 | 13.3 | — | — | — | — | 13.3 | 13.3 |
| Phthalocyanine green | — | — | 13.3 | 13.3 | — | — | — | — |
| Ultramarine | — | — | — | — | 13.3 | 13.3 | — | — |
| White vaseline | — | — | — | — | — | — | — | — |
| Writing characteristic | ○ | Δ | ○ | Δ | ○ | Δ | ○ | Δ |
| Mechanical strength | 15.3 | 52.3 | 17.7 | 55.7 | 16.5 | 51.9 | 16.2 | 58.9 |

(writing characteristic)

The writing characteristic of each non-calcined lead of a colored pencil prepared in the above-mentioned Examples and Comparative Examples was evaluated. 10 person wrote something on a drawing paper with each colored pencil prepared in Examples and Comparative Examples and evaluated the writing characteristic of each colored pencil. The number of Examples and Comparative Examples on those pencils were covered. Then, the writing characteristic was evaluated generally on the following basis. This general evaluation of the coloring power is shown in Table 6 to Table 12.

○: More than 8 person evaluated that the writing characteristic was good enough. (preferable for the practical use)

Δ: 5 to 7 person evaluated that the writing characteristic was good enough.(applicable for the practical use)

X: Less than 4 person evaluated that the writing characteristic was good enough. (not suitable for the practical use)

(Mechanical strength)

The flexural strength (mechanical strength) is measured based on JIS S 6005. The lead was supported at both edges and its center portion was loaded. The load added at the time of the lead breaks was measured and this load was substituted into the formula of JIS test method to calculate the flexural strength (MPa). The results are shown in Table 6 to Table 12.

As can be under stood from the Table 6 to Table 12, The non-calcined leads prepared in Examples have improved mechanical strength compared to those prepared in Comparative Example 14 to 19. Moreover, the non-calcined leads of Examples have the same level of writing characteristic as those of Comparative Example 14 to 19.

With regard to the non-calcined lead of a colored pencil prepared in Comparative Examples 20 to 27 containing wollastonite, attapulgite, halloysite kaolin and sepiolite as a body filler, when the content of the body filler is less than 1% by weight relative to ingredient composition (solid content), the writing characteristic deteriorates. On the other hand, when the content exceeds 20% by weight, the mechanical strength is not always enough. Although the non-calcined leads of a colored pencil of Comparative Examples 20 to 27 are applicable to practical use, the preferable content of wollastonite, attapulgite, halloysite kaolin and sepiolite is within the range between 1% by weight and 20% by weight relative to the total amount of the ingredient component (solid content) as indicated by Examples.

Among the non-calcined leads of a colored pencil containing above-mentioned wollastonite, attapulgite, halloysite kaolin and sepiolite, that containing sepiolite shows particularly good results.

Synthetic mica . . . synthetic mica: available from Topy Industries Ltd. under the trade name of "DMA-350".

Watchung red Sr . . . Pigment of Watchung red Sr (C.I.PR48:3)

Phthalocyanine blue . . . Pigment of Phthalocyanine blue (C.I.PB15)

Hansa Yellow . . . Pigment of Hansa Yellow 10G (C.I. PY3)

TABLE 13

| | % by weight | | | | | | | | | | |
|---|---|---|---|---|---|---|---|---|---|---|---|
| | Example | | | | | | | | Comparative Example | | |
| | 52 | 53 | 54 | 55 | 56 | 57 | 58 | 59 | 28 | 29 | 30 |
| Na-CMC | — | — | — | — | — | — | — | — | 6.0 | 6.0 | 6.0 |
| NH$_4$-CMC | 6.0 | 6.0 | 6.0 | 6.0 | 3.0 | 15.0 | 2.0 | 18.0 | — | — | — |
| Talc | 69.0 | 69.0 | 69.0 | 69.0 | 72.0 | 60.0 | 73.0 | 57.0 | 69.0 | 69.0 | 69.0 |
| Boron nitride | 5.0 | 5.0 | 5.0 | — | 5.0 | 5.0 | 5.0 | 5.0 | 5.0 | 5.0 | 5.0 |
| Synthetic mica | — | — | — | 5.0 | — | — | — | — | — | — | — |
| Watchung red Sr | 20.0 | — | — | 20.0 | 20.0 | 20.0 | 20.0 | 20.0 | 20.0 | — | — |
| Phthalocyanine blue | — | 20.0 | — | — | — | — | — | — | — | 20.0 | — |
| Hansa yellow 10G | — | — | 20.0 | — | — | — | — | — | — | — | 20.0 |
| Total | 100 | 100 | 100 | 100 | 100 | 100 | 100 | 100 | 100 | 100 | 100 |

The non-calcined lead of a colored pencil of the present Examples, comprises a binder, a colorant and a body filler and further includes oil, fat, wax and a lubricant wherein the mentioned body filler is at least one compound selected from the group consisting of wollastonite, attapulgite, halloysite kaolin and sepiolite. Therefore, the non-calcined lead of a colored pencil of the present Examples has a remarkably improved mechanical strength while maintaining the writing characteristic.

(Non-calcined lead of colored pencil containing CMC)

The non-calcined leads of a colored pencil of the following Examples and Comparative Examples are prepared with compounds shown in the Table 13. Table 13 shows the amount of the ingredients (% by weight) without that of water.

The method for preparation of the Examples and the Comparative Examples is as follows: the ingredients shown in table 13 were kneaded with the same amount of water. After that, it was formed to a lead with its diameter of 3 mm while containing about 20% of water, by using a plunger extruder. Then,the water was removed by drying and the lead was heated at 70° C. for 12 hours. The lead was impregnated with the liquid paraffin to obtain a non-calcined lead of a colored pencil.

The raw ingredients used in the Examples and Comparative Examples are as follows:

Na—CMC . . . sodium carboxymethylcellulose: available from Daicel Chemical Industries, Ltd. under the trade name of "DAICEL CMC 1130"

NH$_4$—CMC . . . ammonium carboxymethylcellulose: available from Daicel Chemical Industries, Ltd. under the trade name of "DN-100L"

Talc . . . talc: available from NIPPON TALC CO.,LTD. under the trade name of "MICROACE P-4"

Boron nitride . . . boron nitride: available from SHOWA DENKO Co.,Ltd. under the trade name of "UHP-S1"

(Coloring amount test)

The non-calcined leads of a colored pencil of Examples 52–59 and Comparative Examples 28–30 that had been allowed to stand for one hour at 20° C. , the humidity of 65% and 85% were subjected to the writing test machine and wrote a line of 250 m length under the condition that temperature: 23° C. , load: 300 g, angle: 70°. The weight of each lead was measured before and after writing. The difference of weight was evaluated as the coloring amount (mg). The results are shown in the Table 14.

(Measurement of the diameter of the lead)

The non-calcined leads of a colored pencil of Examples 52–59 and Comparative Examples 28–30 were allowed to stand for one hour at 20° C. , the humidity of 65% and 85 %. Then the diameter of each lead was measured by dial gage. The results are shown in Table 14. The number is mm.

(Writing characteristic)

The writing characteristic of colored pencils prepared with each non-calcined lead of a colored pencil of the above-mentioned Examples and Comparative Examples were examined. The number of Examples and Comparative Examples on those pencils were covered. Under two different condition, that is, at 20° C. and the different humidity of 65% and 85%, 10 person wrote something on a drawing paper with each colored pencil and evaluated the writing characteristic of each colored pencil on their own basis. Then, the writing characteristic was evaluated generally on the following basis. This- general evaluation of the writing characteristic is shown in Table 14.

◦: More than 8 person evaluated that the writing characteristic was good enough.

Δ: 5 to 7 person evaluated that the writing characteristic was good enough.

X : Less than 4 person evaluated that the writing characteristic was good enough.

TABLE 14

|  | Humidity | Example 52 | 53 | 54 | 55 | 56 | 57 | 58 | 59 | Comparative Example 28 | 29 | 30 |
|---|---|---|---|---|---|---|---|---|---|---|---|---|
| coloring amount | 65% | 20.3 | 16.7 | 18.5 | 19.4 | 21.5 | 16.2 | 22.8 | 9.8 | 19.3 | 20.5 | 18.7 |
|  | 85% | 19.8 | 16.8 | 18.3 | 18.9 | 20.8 | 16.3 | 20.9 | 10.0 | 9.3 | 15.3 | 13.7 |
| Diameter of the lead | 65% | 2.78 | 2.77 | 2.75 | 2.76 | 2.76 | 2.75 | 2.76 | 2.75 | 2.74 | 2.75 | 2.74 |
|  | 85% | 2.79 | 2.78 | 2.76 | 2.77 | 2.77 | 2.75 | 2.79 | 2.74 | 2.82 | 2.81 | 2.80 |
| writing characteristic | 65% | ○ | ○ | ○ | ○ | ○ | ○ | ○ | ○ | ○ | ○ | ○ |
|  | 85% | ○ | ○ | ○ | ○ | ○ | ○ | ○ | ○ | x | x | x |

As can be understood from the Table 14, with the Examples prepared with ammonium CMC as a binder, the coloring amount and diameter of lead does not change with humidity because the prepared lead contains CMC acid. On the other hand, with the Comparative Examples containing sodium CMC as a binder, the coloring amount lowers at humidity of 85% and its coloring power seemed to deteriorate at high humidity. Further, the diameter of leads of the Comparative Examples were enlarged at high humidity, that is, the leads were expanded.

In case the amount of ammonium CMC is less than 3% by weight relative to the total amount of the raw ingredient composition (solid content), the forming-performance lowers even it is applicable to practical use. In case the amount of ammonium CMC exceeds 15% by weight relative to the total amount of the raw ingredient composition (solid content), the writing characteristic deteriorates even it is applicable to practical use.

Example 55 containing the synthetic mica as a lubricant has better evaluation of the writing characteristic compared with the Examples 52–54 containing the boron nitride as a lubricant. Moreover, the coloring amount and diameter of lead of Example 55 does not change with humidity, that is, as the other Examples, its efficiency does not deteriorates with humidity The non-calcined lead of a colored pencil of the present Examples can maintain excellent coloring power and writing characteristic even at high humidity and their diameter does not expand because it comprises the binder, the colorant, the body filler and the lubricant as raw ingredients and further including fats and oils and/or wax wherein the mentioned binder is CMC acid.

What is claimed is:

1. A non-calcined lead of a colored pencil comprising a binder, a colorant, a body filler and a lubricant, wherein said lubricant is synthetic mica.

2. A non-calcined lead of a colored pencil as set forth in claim 1, wherein the content of the synthetic mica is 1% by weight to 15% by weight relative to the total amount of raw ingredients (solid content).

3. A non-calcined lead of a colored pencil comprising a binder, a colorant, a body filler and a lubricant, wherein the binder is carboxymethylcellulose acid.

4. A non-calcined lead of a colored pencil as set forth in claim 3, wherein the carboxymethylcellulose acid is obtained by elimination of ammonia molecules from ammonium carboxymethylcellulose by heating a formed lead.

5. A non-calcined lead of a colored pencil as set forth in claim 4, wherein the content of the ammonium carboxymethylcellulose is 3% by weight to 15% by weight relative to the total amount of the raw ingredients (solid content).

6. A method for making a non-calcined lead of a colored pencil comprising the following steps:
 kneading ingredients comprising a binder including ammonium carboxymethylcellulose, a colorant and a body filler;
 forming a lead from the kneaded ingredients;
 and heating the formed lead so that ammonia molecules are eliminated from the ammonium carboxymethylcellulose.

7. A method for making a non-calcined lead of a colored pencil as set forth in claim 6, wherein the temperature for eliminating ammonia molecules from the ammonium carboxymethylcellulose ranges from 60° C. to 80° C.

8. A method for making a non-calcined lead of a colored pencil comprising the following steps;
 kneading ingredients comprising a binder including a ammonium carboxymethylcellulose, a colorant and a body filler;
 forming a lead from the kneaded ingredients; and
 heating the formed lead to a temperature such that ammonia molecules can be eliminated from the ammonium carboxymethylcellulose,
 and impregnating at least one selected from fats, oils, and wax into the formed lead after heating.

9. A method for making non-calcined lead of a colored pencil as set forth in claim 8, wherein the ingredients are kneaded, formed, and dried, and heated.

10. A non-calcined lead of a colored pencil obtained by the following process:
 preparing a composition by adding a binder or a binder solution to a mixture comprising at least a colorant and a body filler;
 kneading the resultant composition;
 introducing to the composition an O/W emulsion comprising at least an oily substance being a liquid at ordinary temperature, one or more surfactant(s) having a H.L.B. value of not less than 7 nor more than 18 and water to form a compound;
 shaping the compound; and
 removing the water contained in the O/W emulsion from the compound.

11. A method for making a non-calcined lead of a colored pencil comprising the following steps:
 preparing a composition by adding a binder or a binder solution to a mixture comprising a colorant and a body filler;
 kneading the resultant composition;
 introducing to the composition an O/W emulsion comprising an oily substance being a liquid at ordinary temperature, one or more surfactant(s) having a H.L.B. value of not less than 7 nor more than 18 and water to form a compound;
 shaping the compound; and
 removing the water contained in the O/W emulsion from the compound after shaping.

12. A non-calcined lead of a colored pencil obtained by the following process:

preparing a mixture by adding a binder or its solution to a mixture comprising at least a colorant, a body filler, and a solvent;

kneading the resultant mixture compound after which the solvent is removed;

introducing hereto the O/W emulsion comprising at least an oily substance being a liquid at ordinary temperature, one or more surfactant(s) having an H.L.B. value of not less than 7 nor more than 18, and water, and the mixed ingredients are formed; and removing the water contained in the O/W emulsion and any remaining solvent.

13. A non-calcined lead of a colored pencil comprising a binder, a colorant, a body filler comprising wollastonite, at least one selected from fats, oils, and wax, and a lubricant.

14. A non-calcined lead of a colored pencil comprising a binder, a colorant, a body filler comprising attapulgite, at least one selected from fats, oils, and wax, and a lubricant.

15. A non-calcined lead of a colored pencil comprising a binder, a colorant, a body filler comprising halloysite kaolin, at least one selected from fats, oils, and wax, and a lubricant.

16. A non-calcined lead of a colored pencil comprising a binder, a colorant, a body filler comprising sepiolite, at least one selected from fats, oils, and wax, and a lubricant.

17. A non-calcined lead of a colored pencil comprising a binder, a colorant, a body filler, at least one selected from fats, oils, and wax, and a lubricant,
wherein the body filler is at least one selected from the group consisting of wollastonite, attapulgite, halloysite kaolin, and sepiolite, and is present in an amount of 1% by weight of a total solid content of the lead.

18. The non-calcined lead of a colored pencil according to claim 1 further comprising at least one selected from fats, oils, and wax.

19. The non-calcined lead of a colored pencil according to claim 3 further comprising at least one selected from fats, oils, and wax.

20. The method for making a non-calcined lead of a colored pencil according to claim 11, wherein the step of preparing a composition further comprises adding a solvent.

21. The method for making a non-calcined lead of a colored pencil according to claim 11, further comprising a step of removing the solvent prior to the step of kneading the resultant composition.

22. The method for making a non-calcined lead of a colored pencil according to claim 11, wherein the step of removing the water contained in the O/W emulsion further comprises removing any remaining solvent.

* * * * *